(12) United States Patent
Kates

(10) Patent No.: US 6,778,413 B2
(45) Date of Patent: Aug. 17, 2004

(54) ASYMMETRIC MULTI-CONVERTER POWER SUPPLY INCLUDING A FAST RESPONSE CONVERTER

(75) Inventor: Barry K. Kates, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 10/422,455

(22) Filed: Apr. 24, 2003

(65) Prior Publication Data

US 2003/0202366 A1 Oct. 30, 2003

Related U.S. Application Data

(63) Continuation of application No. 09/798,550, filed on Mar. 2, 2001, now Pat. No. 6,577,515.

(51) Int. Cl.$^7$ ............................. H02M 3/24; H02H 3/22
(52) U.S. Cl. ........................ 363/65; 363/56.12; 361/111
(58) Field of Search ........................... 363/56.01, 56.02, 363/56.12, 65; 361/111

(56) References Cited

U.S. PATENT DOCUMENTS 5,612,580 A * 3/1997 Janonis et al. ................ 307/64
6,577,515 B2 * 6/2003 Kates ........................... 363/65

* cited by examiner

Primary Examiner—Adolf Berhane
(74) Attorney, Agent, or Firm—Meyertons Hood Kivlin Kowert & Goetzel, P.C.; B. Noël Kivlin

(57) ABSTRACT

An asymmetric multi-converter power supply including a first converter and a second converter coupled to provide power to an output node. A control circuit is coupled to the second converter and is configured to selectively enable the second converter depending upon a voltage at the output node. The control circuit may be configured to enable the second converter only in response to determining that the voltage at the output node is not within a predetermined range. Alternatively, the first converter is configured to provide power through a first series inductor and the second converter is configured to provide power to the output node through a second series inductor. The second series inductor having a smaller inductance than the first series inductor. Additionally, the second converter may be characterized by a transient response time that is faster than a transient response time of the first converter.

24 Claims, 3 Drawing Sheets

ASYMMETRIC MULTI-CONVERTER POWER SUPPLY INCLUDING A FAST RESPONSE CONVERTER

This application is a continuation application of U.S. patent application Ser. No. 09/798,550, filed Mar. 2, 2001 now U.S. Pat. No. 6,577,515.

BACKGROUND OF THE INVENTION

1. Field of the Invention

This invention relates to computer systems and, more particularly, to microprocessor power supplies.

2. Description of the Related Art

Modern microprocessors typically require high currents at low operating voltages. One type of power supply capable of providing such characteristics is a multi-phased or sequential power converter. The sequential converter uses multiple switching stages, where each stage may provide a portion of the load current during a particular active portion of the duty cycle. The stages are switched sequentially by control logic, which may ensure that the duty cycle of each stage is closely matched and thus that the load current is balanced among the stages.

However, this type of converter design may become complex and expensive as the input to output voltage differential increases and the output current requirement increases. This complexity may be due to the necessity of additional phases and the balancing of the load current.

One requirement for a microprocessor power supply may be to provide power in an efficient manner. Another requirement may be for the power supply to have a fast transient response. However, for a power supply to provide a fast transient response, the power supply may be required to provide peak output currents which are high enough to suppress voltage transients at the power supply output. To provide sufficient peak output current during a transient, it may be necessary to choose components that allow higher peak output currents. These higher peak output currents may cause higher reflected input currents. Therefore, power supply efficiency may suffer due to higher power losses associated with higher root mean square (RMS) input currents.

SUMMARY OF THE INVENTION

Various embodiments of an asymmetric multi-converter power supply are disclosed which include a first converter and a second converter coupled to provide power to an output node. In one particular embodiment, a control circuit is coupled to the second converter and is configured to selectively enable the second converter depending upon a voltage at the output node. The control circuit may be configured to enable the second converter only in response to determining that the voltage at the output node is not within a predetermined range. In one particular implementation, the second converter is configured to provide the power in response to one or more transient voltage events at the output node. Additionally, the second converter is characterized by a transient response time that is faster than a transient response time of the first converter, which is configured to provide the power in a steady state.

In another embodiment of an asymmetric multi-converter power supply, a first converter and a second converter are configured to provide power to an output node. The first converter is configured to provide power through a first series inductor. The second converter is configured to provide power to the output node through a second series inductor. The second series inductor has a smaller inductance than the first series inductor. Additionally, a control circuit is coupled to the second converter and is configured to selectively enable the second converter depending upon a voltage at the output node.

Figure 1:
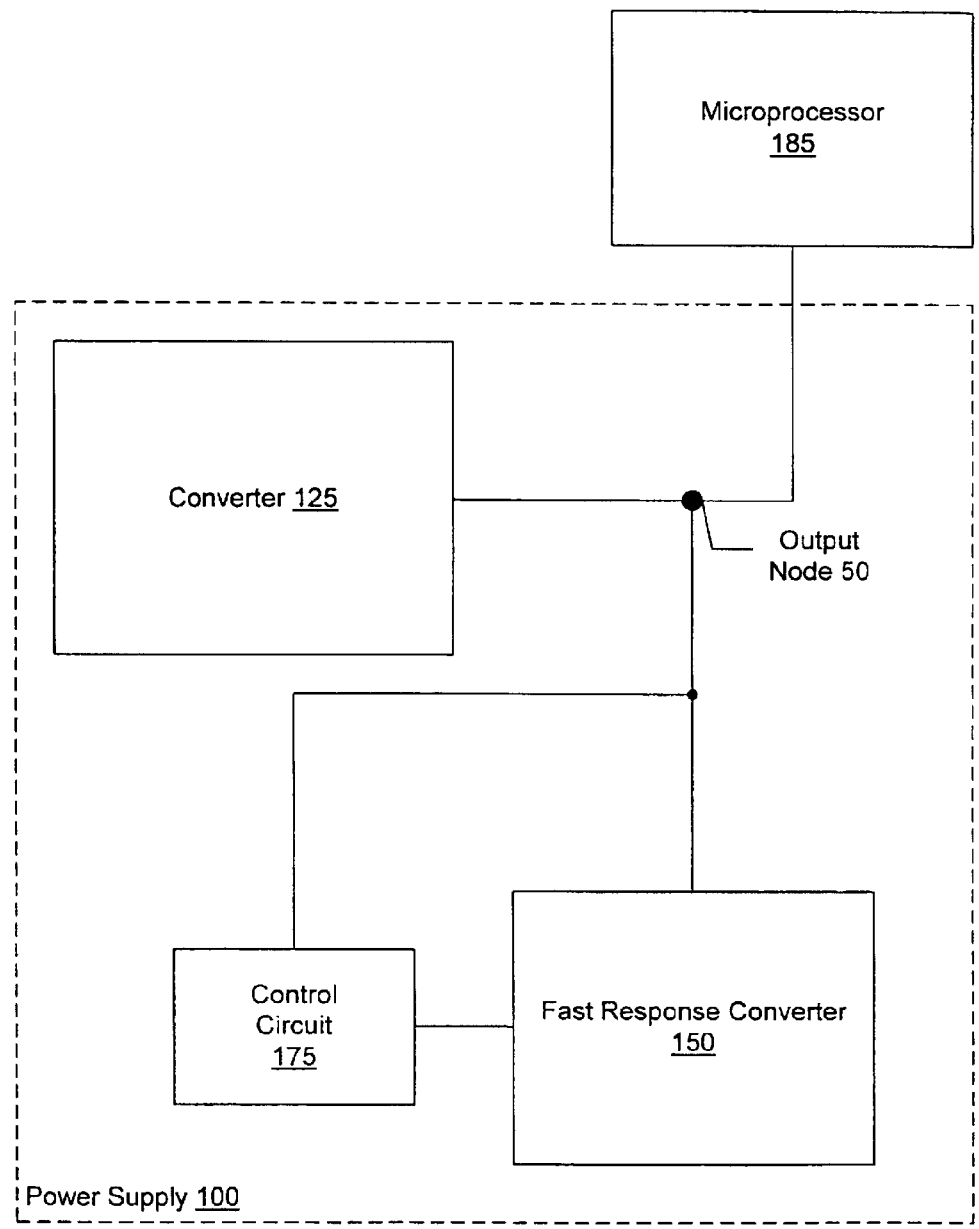
FIG. 1 is a block diagram of one embodiment of a power supply.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to FIG. 1, a block diagram of one embodiment of a power supply 100 is shown. The power supply 100 includes a converter 125 and a fast response converter 150 coupled to an output node 50. Additionally, a control circuit 175 is coupled to fast response converter 150 and to output node 50. Power supply 100 is shown supplying power to a microprocessor 185 as an exemplary load device. It is noted that in other embodiments, power supply 100 may supply power to other devices.

In one embodiment, converter 125 may be one of many stand-alone power supply converters such as, for example, a multiphase switching power supply or a bridge converter power supply. As will be described further below, various embodiments of converter 125 may be configured to provide steady state power and therefore may be optimized to provide high currents with high efficiency. As used herein, steady state refers to static load conditions where the voltage and current remain constant within a specified margin.

For power supply 100 to respond to transient voltage events that may occur at output node 50, fast response converter 150 is configured with a transient response characteristic that is faster than the transient response characteristic of converter 125. In one embodiment, fast response converter 150 may be disabled during normal operation of power supply 100. However, when a transient voltage event occurs, such as a voltage sag, fast response converter 150 may be enabled until the voltage at output node 50 returns to a specified value, at which time fast response converter 150 may be disabled. Operation of various embodiments of a suitable fast response converter will be described in greater detail below.

In one embodiment, control circuit 175 may be configured to monitor the voltage at output node 50 and the current that flows out of fast response converter 150. Control circuit 175 may selectively enable fast response converter 150 depending on the voltage at output node 50. Control circuit 175 may also disable fast response converter 150 depending on the current provided by fast response converter 150 during a transient event. One particular implementation of a suitable control circuit will be described in greater detail below.

Figure 2:
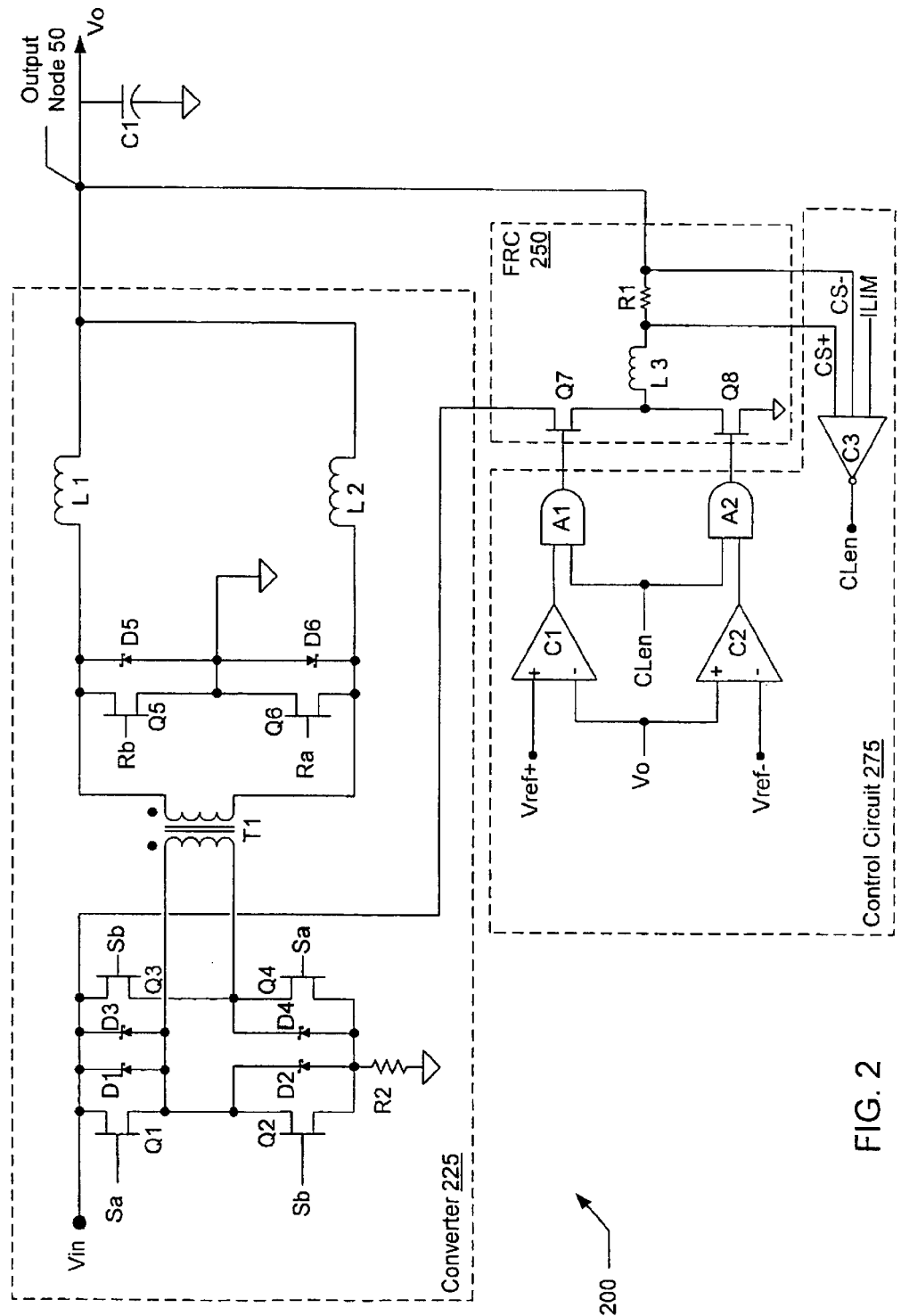
FIG. 2 is a diagram of one embodiment of an asymmetric multi-converter power supply.

Referring to FIG. 2, a diagram of one embodiment of an asymmetric multi-converter power supply 200 is shown. The asymmetric multi-converter power supply 200 may provide power to a device such as microprocessor 185 of FIG. 1. Asymmetric multi-converter power supply 200 of FIG. 2 includes a converter 225 and a fast response converter 250 each coupled to an output node 50. A control circuit 275 is also coupled to output node 50 and to fast response converter 250.

In the illustrated embodiment, converter 225 is a buck-derived full bridge converter with a current doubler synchronous rectifier. The bridge portion of converter 225 may include transistors Q1–Q4 and rectifiers D1 through D4. The current doubler includes a step-down transformer T1, transistors Q5 and Q6, diodes D5 and D6 and inductors L1 and L2. The transistors may be of the power switching type of transistor class such as a metal oxide semiconductor field effect transistor (MOSFET), for example.

During operation, control signals Sa, Sb, Ra and Rb control the switching and timing of converter 225. These control signals may come from a circuit such as, for example, a pulse width modulation circuit (not shown). By switching control signals Sa and Sb on and off, current is allowed to flow through the primary winding of transformer T1 first in one direction and then in the opposite direction. The current flowing in the primary of transformer T1 causes current to flow in the secondary of transformer T1, also in both directions. By switching control signal Ra and Rb on an off, current flows through output series inductors L1 and L2 in both directions. The current in the inductors either ramps up or down depending on the instantaneous polarity created in the inductors. The ramping currents create a waveform similar to a saw tooth waveform. The summation of the inductor currents develops an output voltage Vo across output capacitor C1.

Transformer T1 is a step down transformer, which may be used to step down the input voltage while allowing higher currents in the secondary. The turns ratio may be selected to achieve a desired input to output voltage ratio.

In the current doubler synchronous rectifier circuit portion of converter 225, inductors L1 and L2 may be optimally sized to accommodate steady state or static current flow with high efficiency. Increasing the output inductance values of L1 and L2 may lower the peak inductor currents and the corresponding reflected input RMS currents, which may lead to efficiency improvements due to reduced power losses.

A fast response converter may be provided to accommodate transient operation. In the illustrated embodiment, fast response converter 250 includes transistors Q7 and Q8 and an inductor L3. Fast response converter 250 also includes a series output resistor R1. Transistors Q7 and Q8 may also be power switching transistors such as MOSFETs, for example. Q7 and Q8 may be characterized as having three terminal connections: a gate and two conduction terminals through which current may flow when a positive voltage is applied to the gate terminal.

Transistors Q7 and Q8 are connected in series such that one conduction terminal of Q7 is connected to an input voltage Vin and the other conduction terminal of Q7 is connected to one conduction terminal of Q8. The other conduction terminal of Q8 is connected to circuit ground. Inductor L3 is connected to the node between Q7 and Q8. Resistor R1 is connected in series to inductor L3. The output terminal of resistor R1 is connected to output node 50 of asymmetric multi-converter 200. In one embodiment, fast response converter 250 may be configured such that during normal operation of asymmetric multi-converter 200, neither transistor Q7 nor Q8 is in the 'on' state. As will be described in greater detail below, control circuit 275 provides control signals, Which may selectively enable transistors Q7 and Q8 to conduct, thereby allowing fast response converter 250 to provide power to output node 50. It is noted that the particular circuit implementation of fast response converter 250 as illustrated in FIG. 2 is exemplary and that other specific circuit configurations are contemplated.

In one particular embodiment, control circuit 275 includes a pair of voltage comparators VC1 and VC2, which is coupled to a pair of two input AND gates A1 and A2 and a differential comparator VC3. The input voltages to comparator VC1 include the output voltage Vo of asymmetric multi-converter 200 and a derived reference voltage Vref+ that is a predetermined percentage below Vo. The output of VC1 is one input to AND gate A1. The output of AND gate A1 is an output enable, which is connected to the gate terminal of transistor Q7 of fast response converter 250. The input voltages to comparator VC2 include the output voltage Vo and a second derived reference voltage Vref− that is a predetermined percentage above Vo. The output of VC2 is one input to AND gate A2. The output of AND gate A2 is another output enable, which is connected to the gate terminal of transistor Q8 of fast response converter 250. The differential input voltage terminals CS+ and CS− of comparator VC3 are connected across output resistor R1 of fast response converter 250. The reference voltage ILIM of comparator VC3 may be an externally applied reference voltage corresponding to a current limit value. The output CLen of comparator VC3 is connected to the second input of each of AND gates A1 and A2.

During operation, control circuit 275 monitors output voltage Vo at output node 50. If a transient voltage event occurs causing output voltage Vo to drop below the predetermined value Vref+, the output voltage of comparator VC1 may transition to a voltage corresponding to a logic level of one. If the differential voltage input at comparator VC3 is below the reference voltage ILIM, the output of VC3 will be at a voltage corresponding to logic level of one. Therefore, AND gate A1 will output a logic one causing transistor Q7 of fast response converter 250 to conduct. This allows current to begin ramping in a positive direction through inductor L3 and resistor R1. As the current ramps up, the voltage at output node 50 may begin to increase. When the voltage reaches a value above Vref+, comparator VC1 will transition to a voltage corresponding to logic level of zero, thus causing transistor Q7 to cut off. The slope of the current ramp may be optimized by the value of inductor L3. Inductor L3 may be selected to allow a steep current slope and thus a fast response to the transient voltage event. Therefore, the inductance value of inductor L3 may be smaller than the inductance values selected for inductors L1 and L2 of bridge converter 225. Bridge converter inductor values may range from 1 uH to 3 uH. Fast recovery converter inductor values may range from 0.2 uH to 0.7 uH. Operation is similar when a transient voltage occurring at output node 50 results in a voltage increase above Vref−. The output of comparator VC2 will transition to a voltage corresponding to logic level of one. If the differential voltage input at comparator VC3 is below the reference voltage ILIM, the output of VC3 will be a voltage corresponding to logic level of one. Therefore, AND gate A2 will output a logic one causing transistor Q8 of fast response converter 250 to conduct. This allows current to begin ramping in a negative direction to ground through inductor L3 and resistor R1. As the current ramps down, the voltage at output node 50 may begin to decrease. When the voltage reaches a value below Vref−, comparator VC1 will transition to a voltage corresponding to logic level of zero, thus causing transistor Q8 to cut off.

It may be possible that a transient event may be large enough to cause either a voltage sag or spike such that the current ramp provided by fast response converter 250 may be prolonged. If this current were allowed to ramp indefinitely, damage to fast response converter 250 and or external components may result. Therefore, in the illustrated embodiment, to prevent such damage, the voltage developed across resistor R1 is measured by comparator VC3, since the voltage across resistor R1 directly corresponds to the current flowing through resistor R1. Reference voltage ILIM is set to a predetermined value corresponding a current limit. If the voltage across resistor R1 reaches the ILIM voltage, the output CLen of comparator VC3 will transition to a voltage corresponding to logic level of zero, which will cause the outputs AND gates A1 and A2 to transition to logic zeros. This will disable fast response converter 250 and stop the current from ramping. However, if the transient condition is still present, either output of comparators VC1 or VC2 will still be at a voltage corresponding to logic level of one. Thus, when the current stops ramping, the voltage across resistor R1 will either decay or increase according to the time constant of the output circuit. At such a time as the voltage drops below ILIM, the output of comparator VC3 will again transition to a voltage corresponding to logic level of one, thereby enabling fast response converter 250 to again ramp the current. This enabling and disabling action may continue as long as the transient is present or until a predetermined amount of time passes, wherein a timer circuit (not shown) may disable asymmetric multi-converter 200. In such a case, a power down cycle may be necessary to reinitialize asymmetric multi-converter 200. It is noted that the particular circuit implementation of control circuit 225 as illustrated in FIG. 2 is exemplary and that other specific circuit configurations are contemplated.

Figure 3:
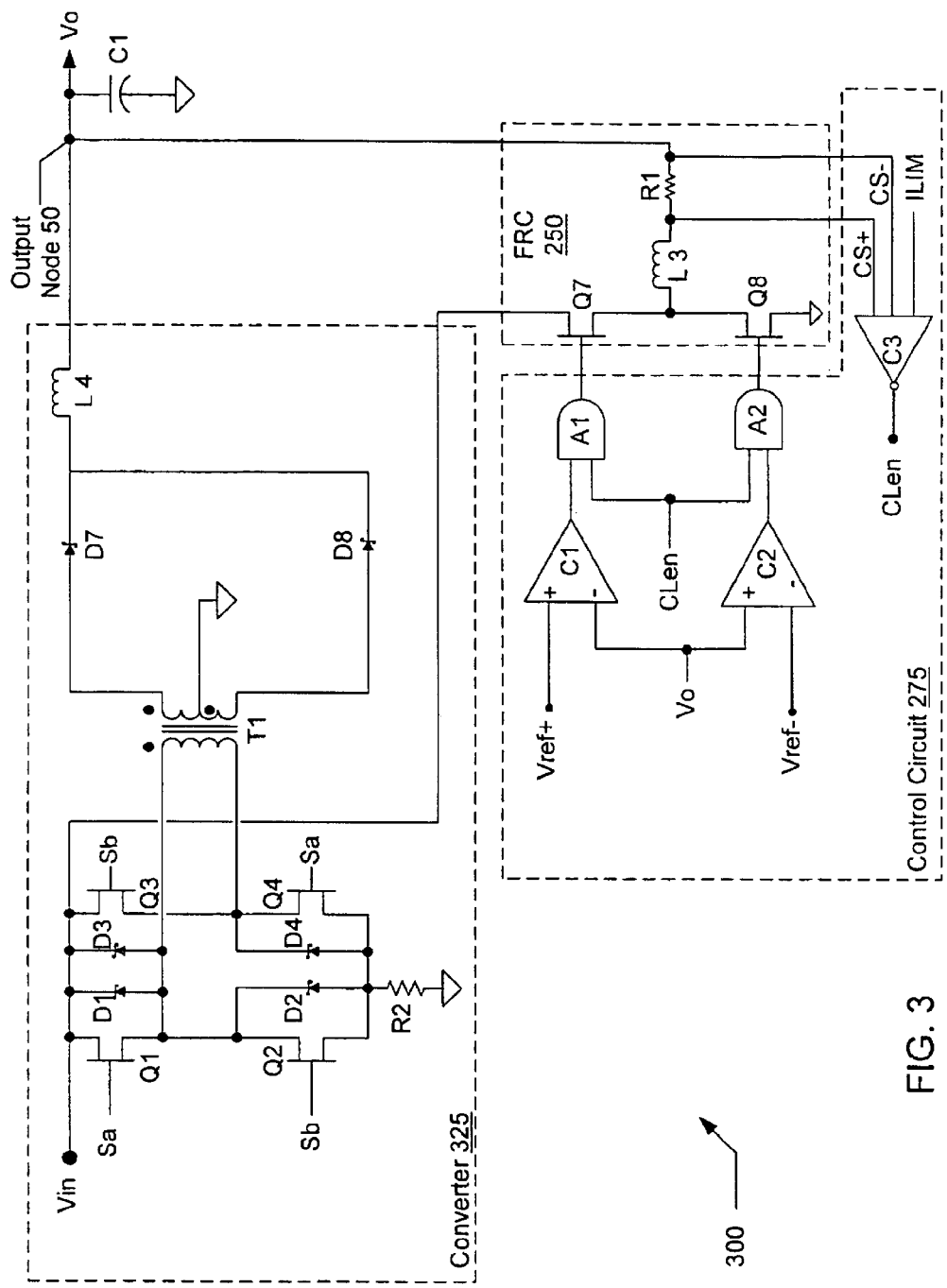
FIG. 3 is a diagram of another embodiment of an asymmetric multi-converter power supply.

Turning to FIG. 3, a diagram of another embodiment of an asymmetric multi-converter power supply 300 is shown. The asymmetric multi-converter 300 of FIG. 3 includes a converter 325, a fast response converter 250 each coupled to output node 50. A control circuit 275 is also coupled to output node 50 and to fast response converter 250.

In the illustrated embodiment, converter 325 of FIG. 3 is a buck-derived full bridge converter. The input portion of converter 325 may include transistors Q1–Q4 and rectifiers D1 through D4. The output portion includes a step-down transformer T1, diodes D7 and D8 and inductor L4. Each of the transistors may be of the power switching type of transistor class such as a metal oxide semiconductor field effect transistor (MOSFET), for example.

During operation, control signals Sa and Sb control the switching and timing of converter 325. These control signals may come from a circuit such as, for example, a pulse width modulation circuit (not shown). By switching control signals Sa and Sb on and off, current is allowed to flow through the primary winding of transformer T1 first in one direction and then in the opposite direction. The current flowing in the primary of transformer T1 causes current to flow in the secondary of transformer T1, also in both directions. As current flows in one direction, one polarity is established in the secondary of T1, and a corresponding current flows through one of the forward biased diodes causing the current to ramp in inductor L4. The timing of the primary circuit may be such that the transistors short the primary of T1 during alternate portions of the duty cycle. During the portions of the duty cycle when the primary of T1 is shorted, both D7 and D8 are forward biased and inductor L4 contributes freewheeling current to the load as the current ramps down. The ramping current may create a waveform similar to a saw tooth waveform, which develops an output voltage Vo across output capacitor C1.

Transformer T1 is a step down, center-tapped transformer, which may be used to step down the input voltage while allowing higher currents in the secondary. The turns ratio may be selected to achieve a desired input to output voltage ratio. The center-tapped secondary provides a current return path during each half cycle.

Similar to the full bridge converter 225 described above in FIG. 2, the bridge converter 325 of FIG. 3 may also be configured to provide power to a static load and therefore be operating under steady state conditions. To accommodate dynamic load conditions and transient events at the load, the fast response converter 250 and control circuit 225 are used in conjunction with converter 325. The operation of control circuit 275 and fast response converter 250 of FIG. 3 is similar to that described above in conjunction with FIG. 2. Corresponding circuit portions are numbered identically for simplicity and clarity.

It is noted that in other embodiments, other types of power supplies or converters may be used to provide power to output node 50 during static loading. Such power supplies may also be configured to provide steady state power and be optimized for efficient high current operation. In addition, other types of fast response circuits may be used to handle transient events at output node 50. These fast response converters may be optimized with a faster slew rate and higher peak currents than the steady state supplies, since it is contemplated they may be configured to operate asymmetrically and therefore only during transient events.

Numerous variations and modifications will become apparent to those skilled in the art once the above disclosure is fully appreciated. It is intended that the following claims be interpreted to embrace all such variations and modifications.

What is claimed is:

1. A power supply comprising:
   a first converter configured to provide DC power to an output node;
   a second converter configured to provide DC power to said output node in parallel with said first converter; and
   a control circuit coupled to said second converter and configured to selectively enable said second converter depending upon a voltage at said output node;
   wherein said control circuit is configured to enable said second converter only in response to determining that said voltage at said output node is not within a predetermined range.

2. The power supply as recited in claim 1, wherein said second converter is configured to provide said DC power in response to one or more transient voltage events at said output node.

3. The power supply as recited in claim 1, wherein said first converter is configured to provide said DC power in a steady state.

4. The power supply as recited in claim 1, wherein said control circuit is further configured to disable said second converter in response to determining that said output voltage at said output node is within said predetermined range.

5. The power supply as recited in claim 1, wherein said control circuit is further configured to alternately enable and disable said second converter in response to detecting a voltage corresponding to a predetermined current at said output node.

6. The power supply as recited in claim 1, wherein said second converter is a buck-derived fast response converter.

7. The power supply as recited in claim 1, wherein said predetermined range is a range of voltages between a positive percentage of said output voltage and a negative percentage of said output voltage.

8. A power supply comprising:
- a first converter configured to provide DC power to an output node;
- a second converter configured to provide DC power to said output node in parallel with said first converter; and
- a control circuit coupled to said second converter and configured to enable said second converter during one or more transient voltage events at said output node.

9. The power supply as recited in claim 8, wherein said first converter is configured to provide said DC power in a steady state.

10. The power supply as recited in claim 8, wherein said control circuit is further configured to enable said second converter only in response to determining that a voltage at said output node is not within a predetermined range.

11. The power supply as recited in claim 8, wherein said control circuit is further configured to disable said second converter in response to determining that said voltage at said output node is within said predetermined range.

12. The power supply as recited in claim 8, wherein said control circuit is further configured to alternately enable and disable said second converter in response to detecting a voltage corresponding to a predetermined current at said output node.

13. The power supply as recited in claim 8, wherein said second converter is a buck-derived fast response converter.

14. The power supply as recited in claim 8, wherein said predetermined range is a range of voltages between a positive percentage of said output voltage and a negative percentage of said output voltage.

15. A method of operating a power supply including a first converter, a second converter and a control circuit, said method comprising:
- the first converter providing DC power to an output node;
- the control circuit selectively enabling the second converter depending upon a voltage at said output node; and
- the second converter providing DC power to said output node in parallel with said first converter during one or more transient voltage events occurring at said output node.

16. The method as recited in claim 15 further comprising the first converter providing said DC power in a steady state.

17. The method as recited in claim 15 further comprising alternately enabling and disabling said second converter in response to detecting a voltage corresponding to a predetermined current at said output node.

18. The method as recited in claim 15 further comprising disabling said second converter in response to detecting that said voltage at said output node is within a predetermined range.

19. The method as recited in claim 15, wherein said predetermined range is a range of voltages between a positive percentage of said voltage at said output node and a negative percentage of said voltage at said output node.

20. A computer system comprising:
- a microprocessor; and
- a power supply coupled to said microprocessor, said power supply including:
  - a first converter configured to provide DC power to an output node;
  - a second converter configured to provide DC power to said output node in parallel with said first converter; and
  - a control circuit coupled to said second converter and configured to enable said second converter during one or more transient voltage events at said output node.

21. The computer system as recited in claim 20, wherein said first converter is configured to provide said DC power in a steady state.

22. The computer system as recited in claim 20, wherein said control circuit is further configured to enable said second converter only in response to determining that a voltage at said output node is not within a predetermined range.

23. The computer system as recited in claim 20, wherein said control circuit is further configured to disable said second converter in response to determining that said voltage at said output node is within said predetermined range.

24. The computer system as recited in claim 20, wherein said control circuit is further configured to alternately enable and disable said second converter in response to detecting a voltage corresponding to a predetermined current at said output node.

* * * * *